(12) United States Patent
Kondo et al.

(10) Patent No.: US 8,445,573 B2
(45) Date of Patent: May 21, 2013

(54) POLYPHENYLENE ETHER RESIN COMPOSITION HAVING NARROW MOLECULAR WEIGHT DISTRIBUTION

(75) Inventors: Tomohiro Kondo, Tokyo (JP); Toru Yamaguchi, Tokyo (JP); Kazunori Terada, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/990,811

(22) PCT Filed: May 8, 2009

(86) PCT No.: PCT/JP2009/058708
§ 371 (c)(1),
(2), (4) Date: Dec. 28, 2010

(87) PCT Pub. No.: WO2009/139336
PCT Pub. Date: Nov. 19, 2009

(65) Prior Publication Data
US 2011/0166269 A1 Jul. 7, 2011

(30) Foreign Application Priority Data
May 12, 2008 (JP) .................................. 2008-125231

(51) Int. Cl.
*C08K 5/17* (2006.01)
*B60C 3/00* (2006.01)

(52) U.S. Cl.
USPC .......................................... 524/252; 524/186

(58) Field of Classification Search
USPC .................................. 524/186, 252
See application file for complete search history.

(56) References Cited

U.S. PATENT DOCUMENTS

| | | | | |
|---|---|---|---|---|
| 3,306,874 A | * | 2/1967 | Hay | ............................ 528/215 |
| 4,011,200 A | | 3/1977 | Yonemitsu et al. | |
| 4,386,174 A | | 5/1983 | Cogswell et al. | |
| 4,992,222 A | | 2/1991 | Banevicius et al. | |
| 4,994,217 A | | 2/1991 | Banevicius et al. | |
| 5,204,410 A | | 4/1993 | Banevicius et al. | |
| 5,484,831 A | | 1/1996 | Higashimura et al. | |
| 5,780,534 A | | 7/1998 | Kleiner et al. | |
| 2003/0092824 A1 | | 5/2003 | Bastiaens et al. | |
| 2004/0138355 A1 | | 7/2004 | Saito et al. | |
| 2004/0214960 A1 | | 10/2004 | Kannan et al. | |
| 2005/0137418 A1 | | 6/2005 | Bauer et al. | |
| 2006/0020064 A1 | | 1/2006 | Bauer et al. | |
| 2007/0259993 A1 | | 11/2007 | Yamaguchi | |
| 2008/0125526 A1 | | 5/2008 | Bae et al. | |
| 2010/0036029 A1 | | 2/2010 | Yamaguchi et al. | |
| 2010/0240813 A1 | | 9/2010 | Terada | |

FOREIGN PATENT DOCUMENTS

| | | |
|---|---|---|
| EP | 0 699 708 B1 | 3/1996 |
| JP | 52-17880 B | 5/1977 |
| JP | 56-115357 A | 9/1981 |
| JP | 57-129 A | 1/1982 |
| JP | 62-240323 A | 10/1987 |
| JP | 2-202918 A | 8/1990 |
| JP | 2-215856 A | 8/1990 |
| JP | 2-265924 A | 10/1990 |
| JP | 5-295121 A | 11/1993 |
| JP | 6-25525 A | 2/1994 |
| JP | 8-3435 A | 1/1996 |
| JP | 8-73720 A | 3/1996 |
| JP | 2001-335699 A | 12/2001 |

(Continued)

OTHER PUBLICATIONS

International Search Report for PCT/JP2009/058708, mailed Jun. 16, 2009.

(Continued)

*Primary Examiner* — John Uselding
(74) *Attorney, Agent, or Firm* — Greenblum & Bernstein, P.L.C.

(57) ABSTRACT

A polyphenylene ether resin composition obtainable by melt-mixing a polyphenylene ether (A) comprising a structural unit (a) represented by formula (1):

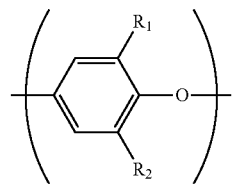

(1)

(wherein $R_1$ and $R_2$ each independently represent a hydrogen atom, a halogen atom, an optionally substituted alkyl group, and the like), and/or a structural unit (b) represented by formula (2):

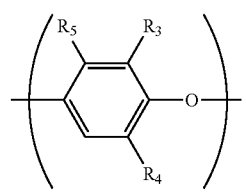

(2)

(wherein $R_3$ and $R_4$ each independently represent a hydrogen atom, a halogen atom, an optionally substituted alkyl group, and the like), with a nitrogen compound (B) comprising at least one group selected from the group consisting of primary amino groups, secondary amino groups and tertiary amino groups in a single molecule thereof, wherein the polyphenylene ether (A) comprises 0.1% by mass or more and 1.5% by mass or less of at least one type of aromatic hydrocarbon (C) containing 7 or 8 carbon atoms.

17 Claims, No Drawings

FOREIGN PATENT DOCUMENTS

| | | |
|---|---|---|
| JP | 2004-51848 A | 2/2004 |
| JP | 2004-51889 A | 2/2004 |
| JP | 2004-107511 A | 4/2004 |
| JP | 2005-508425 A | 3/2005 |
| JP | 2005-179362 A | 7/2005 |
| JP | 2005-226006 A | 8/2005 |
| JP | 2006-37100 A | 2/2006 |
| JP | 2006-249134 A | 9/2006 |
| JP | 2006-299183 A | 11/2006 |
| JP | 2008-37970 A | 2/2008 |
| JP | 2008-63537 A | 3/2008 |
| JP | 2008-239720 A | 10/2008 |
| WO | 02/059208 A | 8/2002 |
| WO | 2005/014719 A1 | 2/2005 |
| WO | 2006/070988 A1 | 7/2006 |

OTHER PUBLICATIONS

International Preliminary Report on Patentability for PCT/JP2009/058708, mailed Dec. 23, 2010.

\* cited by examiner

POLYPHENYLENE ETHER RESIN COMPOSITION HAVING NARROW MOLECULAR WEIGHT DISTRIBUTION

TECHNICAL FIELD

The present invention relates to a polyphenylene ether resin composition having a narrow molecular weight distribution, which is excellent in terms of fluidity during processing, and further, which suppresses the generation of gel and has excellent chemical resistance.

BACKGROUND ART

Polyphenylene ether (hereinafter also referred to as "PPE") is excellent in terms of processability and productivity, and products or components with desired shapes can be efficiently produced from such polyphenylene ether according to molding methods such as a melt injection molding method or a melt extrusion molding method. Accordingly, polyphenylene ether has been widely used as a material for products or components in the field of electric and electronic materials, automobiles, various types of industrial materials, and wrapping materials for food products. With the diversification of intended uses, it has been desired to produce many types of polyphenylene ethers which are excellent in terms of heat resistance and mechanical characteristics and further have different characteristics such as molecular weight and glass transition temperature.

In general, with regard to polyphenylene ether, there is known the phenomenon that its reduced viscosity increases during thermal processing (see Patent Literatures 1 and 2). Accordingly, a molecular design target at the polymerization stage of polyphenylene ether differs from a molecular design target after thermal processing, and thus, operations often become complicated. Therefore, it has been desired to produce polyphenylene ether, the reduced viscosity of which does not change before and after heating, and which maintains a narrow molecular weight distribution in order to maintain physical properties.

It has been generally thought that, when fluidity is required during processing, a wide molecular weight distribution is favorable. On the other hand, a narrow molecular weight distribution is desirable in terms of physical properties. Hence, it has been desired to produce polyphenylene ether, which achieves both good fluidity during processing and good physical properties, namely, has a narrow molecular weight distribution and excellent fluidity during processing. However, under the current circumstances, sufficient studies have not yet been done with regard to this matter.

Patent Literature 2 discloses a PPE composition, which is formed by adding monoamine to polyphenylene ether powder and then subjecting the obtained mixture to press molding at 250° C. for the purpose of improving photostability.

In addition, Patent Literature 3 discloses a PPE composition, which is formed by subjecting polyphenylene ether that has been denatured with benzylamine to press molding in the presence of benzylamine at 280° C. In this publication, a PPE composition, which maintains mechanical strength and suppresses coloration and viscosity increase during heating, can be obtained.

Moreover, Patent Literature 4 discloses polyphenylene ether and polystyrene-based resin compositions, to which polyamine is added as a weld strength promoter for the purpose of improving weld strength.

CITATION LIST

Patent Literature

Patent Literature 1
  Japanese Patent Laid-Open No. 62-240323
Patent Literature 2
  Japanese Patent Laid-Open No. 6-25525
Patent Literature 3
  Japanese Patent Laid-Open No. 8-3435
Patent Literature 4
  International Publication WO2005/014719, pamphlet

SUMMARY OF THE INVENTION

Problems to be Solved by the Invention

Nevertheless, in the case of the methods described in Patent Literatures 2 and 3, a method of producing a sheet or press test piece by press molding must be selected in order to suppress the coloration of a molded product due to heating. As a result, these methods are not suitable for mass and stable production. Moreover, since amine is not uniformly mixed with polyphenylene ether in press molding, the possibility that the effect of containing amine is unevenly distributed cannot be ruled out. Furthermore, the aforementioned publications contain no descriptions regarding the improvement of reduced viscosity after heating, molecular weight distribution, the generation of gel, and chemical resistance. Under the current circumstances, polyethylene ether, which achieves no generation of gel, good productivity, and no decreased chemical resistance, while maintaining a narrow molecular weight distribution, has not yet been produced by any methods.

Further, referring to Examples of Patent Literature 4, there is a linear relationship between the amount of a weld strength promoter and weld strength. As described in Examples, in order to obtain a sufficient weld strength, polyamine should be added in an amount of 5% by mass or more based on the mass of polyphenylene ether. In this case, as described in Reference Examples later, since the addition of a large amount of polyamine deteriorates chemical resistance, it is impossible to achieve both chemical resistance and strength only by mixing polyamine with polyphenylene ether.

Under the above-mentioned circumstances, it is an object of the present invention to provide a polyphenylene ether resin composition having a narrow molecular weight distribution, which is excellent in terms of fluidity during processing, and further, which suppresses the generation of gel and has excellent chemical resistance.

Means for Solving the Problems

As a result of intensive studies direct towards achieving the aforementioned object, the present inventors have found that the object can be achieved with a polyphenylene ether resin composition obtainable by melt-mixing a polyphenylene ether (A) comprising specific structural unit(s) with a nitrogen compound (B) comprising a specific structure, wherein the polyphenylene ether (A) comprises 0.1% by mass or more and 1.5% by mass or less of at least one type of aromatic hydrocarbon containing 7 or 8 carbon atoms, even if wherein a content of the nitrogen compound (B) is extremely smaller than that in prior art techniques. Based on such findings, the inventors have completed the present invention.

Specifically, the present invention is as follows.
[1] A polyphenylene ether resin composition obtainable by melt-mixing a polyphenylene ether (A) comprising a structural unit (a) represented by the following formula (1):

[Formula 1]

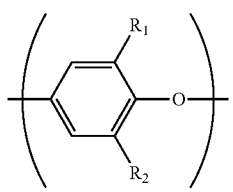

(1)

(wherein $R_1$ and $R_2$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group), and/or a structural unit (b) represented by the following formula (2):

[Formula 2]

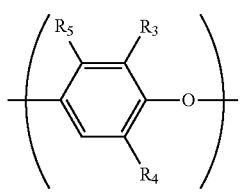

(2)

(wherein $R_3$ and $R_4$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and $R_5$ represents a halogen atom, an optionally substituted alkyl group, an optionally substituted alkoxy group, an optionally substituted aryl group, an optionally substituted aryloxy group, an optionally substituted aralkyl group or an optionally substituted aralkyloxy group), with a nitrogen compound (B) comprising at least one group selected from the group consisting of primary amino group, secondary amino group and tertiary amino group in a single molecule thereof, wherein the polyphenylene ether (A) comprises 0.1% by mass or more and 1.5% by mass or less of at least one type of aromatic hydrocarbon (C) containing 7 or 8 carbon atoms.

[2] The polyphenylene ether resin composition according to [1] above, wherein the polyphenylene ether (A) comprises 0.1% by mass or more and 1.0% by mass or less of the aromatic hydrocarbon (C).

[3] The polyphenylene ether resin composition according to [1] or [2] above, wherein the polyphenylene ether (A) comprises at least two types of the aromatic hydrocarbons (C).

[4] The polyphenylene ether resin composition according to any one of [1] to [3] above, wherein the structural unit (a) is a structural unit (a1) wherein $R_1$ and $R_2$ are methyl groups, and the structural unit (b) is a structural unit (b1) wherein $R_3$, $R_4$ and $R_5$ are methyl groups.

[5] The polyphenylene ether resin composition according to any one of [1] to [4] above, wherein the nitrogen compound (B) is a compound comprising at least three groups selected from the group consisting of primary amino groups, secondary amino groups and tertiary amino groups in a single molecule thereof.

[6] The polyphenylene ether resin composition according to any one of [1] to [5] above, wherein an amine equivalent of the nitrogen compound (B) is 150 or less.

[7] The polyphenylene ether resin composition according to any one of [1] to [6] above, which comprises 0.1 part by mass or more and less than 5 parts by mass of the nitrogen compound (B) based on 100 parts by mass of the polyphenylene ether (A).

[8] The polyphenylene ether resin composition according to any one of [1] to [7] above, wherein a maximum value of a differential molecular weight dW/d(Log M) (P) of the polyphenylene ether (A) is 1.0 or more.

[9] The polyphenylene ether resin composition according to any one of [1] to [8] above, wherein a maximum value of a differential molecular weight dW/d(Log M) (Q) of the polyphenylene ether resin composition is 1.0 or more.

[10] The polyphenylene ether resin composition according to any one of [1] to [9] above, wherein a reduced viscosity ηA of the polyphenylene ether (A) is 0.3 dL/g or more.

[11] The polyphenylene ether resin composition according to any one of [1] to [10] above, wherein a reduced viscosity ηA of the polyphenylene ether (A) and a reduced viscosity ηB of the polyphenylene ether resin composition satisfy a relational expression |(ηB−ηA)/ηA|≦0.1.

[12] The polyphenylene ether resin composition according to [11] above, wherein the relational expression satisfies |(ηB−ηA)/ηA|≦0.08.

[13] The polyphenylene ether resin composition according to any one of [1] to [12] above, wherein the polyphenylene ether (A) is a polymer obtainable by a method comprising: subjecting a mixed phenol compound comprising a phenol compound (c) represented by the following formula (3):

[Formula 3]

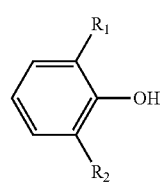

(3)

(wherein $R_1$ and $R_2$ have the same meanings as those described above), and/or a phenol compound (d) represented by the following formula (4):

[Formula 4]

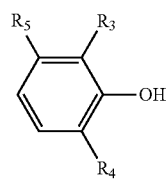

(4)

(wherein $R_3$, $R_4$ and $R_5$ have the same meanings as those described above), to oxidative coupling, using a mixed solvent comprising at least one type of good solvent for the polyphenylene ether and at least one type of poor solvent for the polyphenylene ether, in the presence of a catalyst, using an oxygen-containing gas; and then precipitating the reaction product at a late stage of polymerization.

[14] The polyphenylene ether resin composition according to [13] above, wherein the catalyst comprises a copper compound and/or a halogen compound.

[15] The polyphenylene ether resin composition according to [13] or [14] above, wherein an amount of the residual catalyst is 2 ppm or less.

[16] The polyphenylene ether resin composition according to any one of [13] to [15] above, wherein the phenol compound (c) is 2,6-dimethylphenol and the phenol compound (d) is 2,3,6-trimethylphenol.

ADVANTAGES OF THE INVENTION

According to the present invention, there can be provided a polyphenylene ether resin composition having a narrow molecular weight distribution, which is excellent in terms of fluidity during processing, and further, which suppresses a generation of gel and has excellent chemical resistance.

Since the polyphenylene ether resin composition of the present invention is excellent in terms of fluidity during processing, it is able to stabilize raw material supply during its melt-mixing with other resins.

Moreover, a characteristics of the polyphenylene ether resin composition of the present invention as a polymer are not changed before and after the melt-mixing with heating, and the present polyphenylene ether resin composition maintains a narrow molecular weight distribution. Accordingly, molded products obtained by the heat molding of the polyphenylene ether resin composition of the present invention have excellent mechanical characteristics, and thus the present polyphenylene ether resin composition can be preferably used as mechanical components, automobile components, electric and electronic components, and particularly, sheet or film materials.

MODE FOR CARRYING OUT THE INVENTION

Hereinafter, an embodiment for carrying out the present invention (hereinafter referred to as "the present embodiment") will be described in detail. It is to be noted that the present invention is not limited to the embodiment as described below, but it may be modified in various ways within the range of the gist thereof.

The polyphenylene ether resin composition in the present embodiment is a polyphenylene ether resin composition obtainable by melt-mixing a polyphenylene ether (A) comprising a structural unit (a) represented by the following formula (1):

[Formula 5]

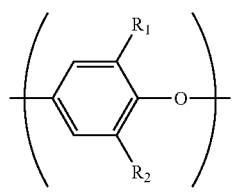

(1)

(wherein $R_1$ and $R_2$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group), and/or a structural unit (b) represented by the following formula (2):

[Formula 6]

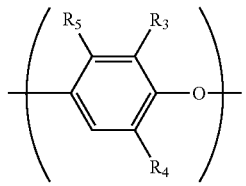

(2)

(wherein $R_3$ and $R_4$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and $R_5$ represents a halogen atom, an optionally substituted alkyl group, an optionally substituted alkoxy group, an optionally substituted aryl group, an optionally substituted aryloxy group, an optionally substituted aralkyl group or an optionally substituted aralkyloxy group), with a nitrogen compound (B) comprising at least one primary amino group, secondary amino group and/or tertiary amino group in a single molecule thereof, wherein the polyphenylene ether (A) comprises 0.1% by mass or more and 1.5% by mass or less of at least one type of aromatic hydrocarbon (C) containing 7 or 8 carbon atoms.

Hereinafter, symbols used in the present embodiment will be described.

The halogen atoms represented by $R_1$, $R_2$, $R_3$, $R_4$ and $R_5$ are a fluorine atom, a chlorine atom, a bromine atom and the like, and preferably, a chlorine atom and a bromine atom.

The "alkyl group" in the optionally substituted alkyl groups represented by $R_1$, $R_2$, $R_3$, $R_4$ and $R_5$ indicates a linear or branched alkyl group containing 1 to 6, and preferably 1 to 3 carbon atoms. Examples of such alkyl group include methyl, ethyl, propyl, isopropyl, butyl, isobutyl, sec-butyl, tert-butyl, pentyl and hexyl. Such alkyl groups are preferably methyl and ethyl, and more preferably methyl.

The "alkoxy group" in the optionally substituted alkoxy groups represented by $R_1$, $R_2$, $R_3$, $R_4$ and $R_5$ indicates a linear or branched alkoxy group containing 1 to 6, and preferably 1 to 3 carbon atoms. Examples of such alkoxy group include methoxy, ethoxy, propoxy, isopropoxy, butoxy, sec-butoxy, tert-butoxy, pentyloxy and hexyloxy. Such alkoxy groups are preferably methoxy and ethoxy.

Examples of the "aryl group" in the optionally substituted aryl groups represented by $R_1$, $R_2$, $R_3$, $R_4$ and $R_5$ include phenyl and naphthyl, and preferably, phenyl.

Examples of the "aryloxy group" in the optionally substituted aryloxy groups represented by $R_1$, $R_2$, $R_3$, $R_4$ and $R_5$ include phenoxy, methylphenoxy, ethylphenoxy, propylphenoxy, butylphenoxy, phenylphenoxy, dimethylphenoxy, diethylphenoxy, dipropylphenoxy, dibutylphenoxy, diphenylphenoxy, trimethylphenoxy, triethylphenoxy, tripropylphenoxy and tributylphenoxy.

The "aralkyl group" in the optionally substituted aralkyl groups represented by $R_1$, $R_2$, $R_3$, $R_4$ and $R_5$ indicates an aralkyl group, the alkyl portion of which is the "alkyl group" as defined above and the aryl portion of which is the "aryl group" as defined above. Examples of such aralkyl group include benzyl, phenethyl, phenylpropyl and 1-naphtylmethyl, and preferably, benzyl.

Examples of the "aralkyloxy group" in the optionally substituted aralkyloxy groups represented by $R_1$, $R_2$, $R_3$, $R_4$ and $R_5$ include phenylmethoxy, phenylethoxy, phenylpropyloxy and phenylbutyloxy.

The alkyl group, alkoxy group, aryl group, aryloxy group, aralkyl group and aralkyloxy group, which are represented by $R_1$, $R_2$, $R_3$, $R_4$ and $R_5$, may be substituted with one or two or more substituents at substitutable positions. Examples of such substituent include a halogen atom (e.g. a fluorine atom, a chlorine atom and a bromine atom), an alkyl group containing 1 to 6 carbon atoms (e.g. methyl, ethyl, propyl, isopropyl, butyl, isobutyl, sec-butyl, tert-butyl, pentyl and hexyl), an aryl group (e.g. phenyl and naphthyl), an aralkyl group (e.g. benzyl and phenethyl), and an alkoxy group (e.g. methoxy and ethoxy).

The polyphenylene ether (A) in the present embodiment comprising the structural unit (a) represented by the above described formula (1) and/or the structural unit (b) represented by the above described formula (2). The polyphenylene ether (A) comprises, as a volatile component, 0.1% by mass or more and 1.5% by mass or less of, preferably 0.3% by mass or more and 1.5% by mass or less of, and more preferably 0.3% by mass or more and 1.0% by mass or less of at least one type of aromatic hydrocarbon (C) containing 7 or 8 carbon atoms, based on the mass of the polyphenylene ether (A). The present inventors have found that when the content of the aromatic hydrocarbon is in the above described concentration range, chemical resistance (hereinafter also referred to as "solvent resistance") and fabricability are excellent, and a narrow molecular weight distribution desired in view of physical properties can maintain, even if additive amount of the nitrogen compound (B) is extremely smaller than that in prior art techniques.

The possible reason why the above described effects can be obtained by containing aromatic hydrocarbon in the specific concentration range into polyphenylene ether is that aromatic hydrocarbon with a molecular weight smaller than that of polyphenylene ether activates the action of a polymer chain to reduce diffusion barrier caused by the polymer chain and exhibits the function as a diffusion aid for increasing the diffusion rate of the nitrogen compound (B) to be diffused into the resin as a whole, so that the nitrogen compound (B) can be more uniformly mixed into the polyphenylene ether resin.

Moreover, if at least two types of the aromatic hydrocarbons (C) are comprised in the polyphenylene ether (A), the effects of the present invention tend to be extremely favorably exhibited. Although we do not need to feel overly attached to a specific theory, the possible reason is that a polymer chain moves more complicatedly when two or more types of aromatic hydrocarbons having different molecular sizes are comprised, so that the diffusion rate of the nitrogen compound (B) to be diffused into the polyphenylene ether is increased during melt-mixing.

When the content of the aromatic hydrocarbon (C) in the polyphenylene ether is less than 0.1% by mass, the aromatic hydrocarbon is added in the range that does not exceed 1.5% by mass based on the polyphenylene ether, so that the content of the aromatic hydrocarbon (C) can be adjusted. In this case, since it is preferable that the aromatic hydrocarbon be uniformly mixed with the polyphenylene ether, the mixture can be more uniformly mixed using a blender, a Henschel mixer, etc., after the addition of the aromatic hydrocarbon.

A ratio of each structural unit in the polyphenylene ether (A) is not particularly limited. Preferably, the structural unit (a) accounts for 100% to 47%, and the structural unit (b) accounts for 0% to 53%, of the total volume of the polyphenylene ether (A). More preferably, the structural unit (a) accounts for 96% to 60%, and the structural unit (b) accounts for 4% to 40%, of the total volume of the polyphenylene ether (A). Further preferably, the structural unit (a) accounts for 87% to 72%, and the structural unit (b) accounts for 13% to 28%, of the total volume of the polyphenylene ether (A). If the two structural units are within the aforementioned ranges, a glass transition temperature Tg becomes high and heat resistance will tend to be excellent with respect to the polyphenylene ether during heating.

A structural unit (a1) wherein $R_1$ and $R_2$ are methyl groups is preferable as the above described structural unit (a) and a structural unit (b1) wherein $R_1$, $R_2$ and $R_3$ are methyl groups is preferable as the above described structural unit (b) because they are more excellent in terms of the fluidity of a polyphenylene ether resin composition during processing.

The polyphenylene ether resin composition in the present embodiment can be obtained by melt-mixing the above described polyphenylene ether (A) and a nitrogen compound (B) comprising at least one group selected from the group consisting of primary amino groups, secondary amino groups and tertiary amino groups in a single molecule thereof, for example, using an apparatus comprising a melt-mixing zone, such as an extruder, a kneader, a Laboplast mill or a film molding machine.

As such a nitrogen compound (B) comprising at least one group selected from the group consisting of primary amino groups, secondary amino groups and tertiary amino groups in a single molecule thereof, nitrogen compounds classified into the following groups are preferable: amines, diamines, polyamines, amides, aminosilanes, aminosilicates, amino silicons, imines, imidazoles, imides, urethanes, enamines, dicyandiamidines, triazenes, triazoles, piperazines, ureas, uric acids, and the like. Of these groups, nitrogen compounds classified into amines, diamines, polyamines, aminiosilicates, imines and imides are preferable.

The nitrogen compound (B) comprises two or more, and preferably three or more groups selected from the group consisting of primary amino groups, secondary amino groups and tertiary amino groups in a single molecule of preferably diamines, polyamines, etc. The nitrogen compound (B) comprises further preferably two or more, and particularly preferably three or more groups selected from the group consisting of primary and secondary amino groups. A molecular weight distribution of a resin composition comprising these nitrogen compounds becomes narrow, and coloration is suppressed during heating. Further, its chemical resistance tends to be favorable.

Furthermore, such primary amino groups, secondary amino groups and tertiary amino groups are each contained in an amount of preferably 0.1% by mole or more, more preferably 5% by mole or more, further preferably 10% by mole or more, and particularly preferably 15% by mole or more. By containing primary amino groups, secondary amino groups and tertiary amino groups, each in an amount of 0.1% by mole or more, into the nitrogen compound (B), the molecular weight distribution tends to become narrower.

Still further, a cage silsesquioxane, into a portion of which an amino group has been introduced, can be preferably used as the nitrogen compound (B), as well as amines, diamines, polyamines, imines, aminosilanes, amino silicons, etc.

Still further, a main chain or side chain of a polymer, a surface of an inorganic matter, a main chain or side chain of an inorganic polymer, and a portion of an organic silicon compound, into which an amino group has been introduced, can also be used.

An amine equivalent of the nitrogen compound (B) is preferably 150 or less, more preferably 100 or less, further preferably 80 or less, and particularly preferably 55 or less. If the amine equivalent of the nitrogen compound (B) is 150 or less, the molecular weight distribution tends to become narrower. The amine equivalent is used herein to mean an equivalent per amino group, and it is a value obtained by dividing the molecular weight by the number of amino groups.

When a polyamine is used as the nitrogen compound (B), a molecular weight of the polyamine is preferably 200 or more, more preferably 300 or more, further preferably 500 or more, and particularly preferably 1000 or more. If the molecular weight of such a polyamine is 200 or more, handleability tends be become favorable during operations. The upper limit of the molecular weight is not particularly limited. If the molecular weight exceeds 80000, there is a risk that the viscosity becomes excessively high and thus that it becomes difficult to treat it. Thus, it is preferable to select a polyamine having a molecular weight of 80000 or less. However, it is easily assumed that, even if a polyamine having a molecular weight of more than 80000 is used, poor handleability may be improved by a pre-treatment and the like.

The above described nitrogen compound (B) may be used, either singly or in combination of two or more types. A content of the nitrogen compound (B) is not particularly limited. It is preferably 0.1 part by mass or more and less than 5 parts by mass based on 100 parts by mass of the polyphenylene ether (A). If the content of the nitrogen compound (B) is less than 0.1 part by mass based on 100 parts by mass of the polyphenylene ether (A), it is likely to become difficult to obtain a polyphenylene ether resin composition having a narrow molecular weight distribution. On the other hand, if it exceeds 5 parts by mass, solvent resistance tends to be decreased. The content of the nitrogen compound (B) is more preferably 0.1 part by mass or more and 3 parts by mass or less, further preferably 0.1 part by mass or more and 1.5 parts by mass or less, and particularly preferably 0.1 part by mass or more and 1.0 part by mass or less, based on 100 parts by mass of the polyphenylene ether (A).

A maximum value of a differential molecular weight dW/d(Log M) (P) of the polyphenylene ether (A) in the present embodiment is preferably 1.0 or more. In addition, a maximum value of a differential molecular weight dW/d(Log M) (Q) of the polyphenylene ether resin composition in the present embodiment is preferably 1.0 or more.

Herein, the differential molecular weight dW/d(Log M) means a value measured by gel permeation chromatography using standard polystyrene as a calibration curve. In general, the larger the maximum value of the differential molecular weight dW/d(Log M) is, the narrower the molecular weight distribution is. This shows that the obtained molded product tends to be excellent in terms of physical properties.

The maximum value of dW/d(Log M) (P) and the maximum value of the differential molecular weight dW/d(Log M) (Q) are preferably within the range from $4 \leq Log\ M \leq 6$ because such maximum values of differential molecular weights tend to bring on excellent physical properties and fluidity during processing. They are more preferably within the range from $4 \leq Log\ M \leq 5.5$, and further preferably within the range from $4.3 \leq Log\ M \leq 5.5$.

Herein, in a case in which components other than polyphenylene ether are comprised in the polyphenylene ether resin composition in the measurement of the differential molecular weight, such components other than polyphenylene ether are preferably reduced to a minimum, for example, by a method of isolating components other than polyphenylene ether, using a solvent that dissolves polyphenylene ether but does not dissolve the components other than the polyphenylene ether, or a method of isolating polyphenylene ether, using a solvent that dissolves components other than polyphenylene ether but does not dissolve the polyphenylene ether, or the like. A person skilled in the art could readily understand such a thing.

A reduced viscosity $\eta A$ of the polyphenylene ether (A) in the present embodiment is preferably 0.3 (dL/g) or more, more preferably 0.35 (dL/g) or more, and further preferably 0.4 (dL/g) or more. If the reduced viscosity $\eta A$ of the polyphenylene ether (A) is 0.3 (dL/g) or more, it tends to be excellent in terms of the mechanical characteristics of a molded product. The upper limit of the reduced viscosity is not particularly limited. Since there may be a case in which fluidity during molding is decreased in extrusion molding or the like and processability is thereby decreased if the reduced viscosity is too high, the upper limit of the reduced viscosity is preferably less than 1.5 (dL/g), more preferably 1.3 (dL/g) or less, and further preferably 1.1 (dL/g) or less.

Moreover, a reduced viscosity $\eta B$ of the polyphenylene ether resin composition in the present embodiment is preferably 0.3 (dL/g) or more, more preferably 0.35 (dL/g) or more, and further preferably 0.4 (dL/g) or more. If the reduced viscosity $\eta B$ is 0.3 (dL/g) or more, it tends to be excellent in terms of the mechanical characteristics of a molded product. The upper limit of the reduced viscosity is not particularly limited. Since there may be a case in which fluidity during molding is decreased in extrusion molding or the like and processability is thereby decreased if the reduced viscosity is too high, the upper limit of the reduced viscosity is preferably less than 1.5 (dL/g), more preferably 1.3 (dL/g) or less, and further preferably 1.1 (dL/g) or less.

The reduced viscosity $\eta A$ is used in the present embodiment to mean the reduced viscosity of a chloroform solution containing 0.5 g/dL polyphenylene ether (A). In addition, the reduced viscosity $\eta B$ is used in the present embodiment to mean the reduced viscosity of a chloroform solution containing 0.5 g/dL polyphenylene ether resin composition after completion of the melt-mixing of the nitrogen compound (B) with the polyphenylene ether (A). Herein, in a case in which insoluble matters are contained, the reduced viscosity indicates a value measured after removing such insoluble matters using 11G Buchner funnel-type glass filter or the like.

The reduced viscosity $\eta A$ of the polyphenylene ether (A) and the reduced viscosity $\eta B$ of the polyphenylene ether resin composition satisfy, preferably a relational expression $|(\eta B - \eta A)/\eta A| \leq 0.1$, more preferably the relational expression $|(\eta B - \eta A)/\eta A| \leq 0.09$, further preferably the relational expression $|(\eta B - \eta A)/\eta A| \leq 0.08$, still further preferably the relational expression $|(\eta B - \eta A)/\eta A| \leq 0.07$, and particularly preferably the relational expression $|(\eta B - \eta A)/\eta A| \leq 0.06$. As a result that the reduced viscosity $\eta A$ and the reduced viscosity $\eta B$ satisfy the relational expression $|(\eta B - \eta A)/\eta A| \leq 0.1$, the polyphenylene ether resin composition maintains a narrow molecular weight distribution, and the mechanical characteristics of a molded product obtained by heat molding tend to become excellent.

When a weight-average molecular weight of the polyphenylene ether (A) is defined as Mw(S) and a weight-average molecular weight of the polyphenylene ether resin composition is defined as Mw(R), the polyphenylene ether resin composition in the present embodiment preferably satisfies the relational expression $(Mw(R) - Mw(S)) \leq 10000$. This value is referred to as an increased value of the weight-average molecular weight. If such an increased value of the weight-average molecular weight is 10000 or less, the polyphenylene ether resin composition tends to be excellent in terms of processability during molding. The increased value of the weight-average molecular weight is preferably 10000 or less, more preferably 8000 or less, further preferably 5000 or less, and particularly preferably 3000 or less.

An SSP value used as an indicator for the fluidity during molding of the polyphenylene ether resin composition in the present embodiment is preferably 1 to 10 (MPa), and more preferably 1 to 8 (MPa). If the SSP value is within the aforementioned range, fluidity during processing tends to become favorable when the polyphenylene ether resin composition is molded.

A mean particle diameter of the polyphenylene ether resin composition in the present embodiment is easily set at 1 mm or more. It is also possible to produce a granulated product of polyphenylene ether resin containing almost no particles having a mean particle diameter of 1 mm or less from the polyphenylene ether resin composition in the present embodiment. In general, it has been known that fine particles with a particle diameter of 106 μm or less are generated in a production process of the polyphenylene ether. Most of the obtained polyphenylene ether resin is constituted with powders having a mean particle diameter of approximately 1 to 300 μm. Herein, from the viewpoint of stable supply of raw materials, ease of operation for workers and handleability, and also taking into consideration work environment such as a suppression of dusts during cleaning, usability in a clean room, etc., there are required to use polyphenylene ether particles with a mean particle diameter of 1 mm or more, which contain almost no particles with a mean particle diameter of 1 mm or less. Accordingly, the polyphenylene ether resin composition in the present embodiment is preferably used as a granulated product with a mean particle diameter of 1 mm or more. The present polyphenylene ether resin composition is used as a granulated product with a mean particle diameter of, more preferably 2 mm or more, further preferably 3 mm or more, and particularly preferably 4 mm or more.

A method for producing the polyphenylene ether (A) in the present embodiment is not particularly limited. There is preferably applied a method, which comprises: subjecting a mixed phenol compound comprising a phenol compound (c) represented by the following formula (3):

[Formula 7]

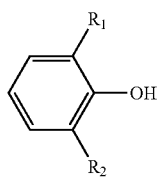

(3)

(wherein $R_1$ and $R_2$ have the same meanings as those described above), and/or a phenol compound (d) represented by the following formula (4):

[Formula 8]

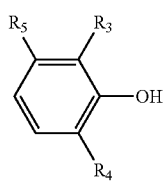

(4)

(wherein $R_3$, $R_4$ and $R_5$ have the same meanings as those described above), to oxidative coupling, using a mixed solvent comprising at least one type of good solvent for the polyphenylene ether and at least one type of poor solvent for the polyphenylene ether, in the presence of a catalyst, using an oxygen-containing gas; and then precipitating a polymer at a late stage of polymerization. This method preferably prevents an increase in the liquid viscosity of a polymerization solution at the late stage of polymerization, so as to facilitate the uniform stirring of the solution.

Examples of the phenol compound (c) include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorphenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorphenol, 2-methyl-6-phenylphenol, 2-phenylphenol, 2,6-diphenylphenol, 2,6-bis-(4-fluorophenyl)phenol, 2-methyl-6-tolylphenol and 2,6-ditolylphenol. Of these, 2,6-dimethylphenol, 2,6-diethylphenol and 2,6-diphenylphenol are preferable, and 2,6-dimethylphenol is more preferable, because of the inexpensiveness and ready availability of these substances.

The above described phenol compound (c) may be used singly or in combination of two or more types. A method of combining 2,6-dimethylphenol with 2,6-diethylphenol and using them, a method of combining 2,6-dimethylphenol with 2,6-diphenylphenol and using them, and the like are applied, for example. In such methods, a mixing ratio of the substances can be selected, as appropriate. Moreover, the used phenol compounds may comprise small amounts of m-cresol, p-cresol, 2,4-dimethylphenol, 2,4,6-trimethylphenol, and the like, as by-products from the production.

Examples of the phenol compound (d) include 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorphenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorphenol, 2-methyl-5-phenylphenol, 2,5-diphenylphenol, 2,5-bis-(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol and 2,6-dimethyl-3-t-butylphenol. Of these, 2,3,6-trimethylphenol and 2,5-dimethylphenol are preferable, and 2,3,6-trimethylphenol is more preferable, because of the inexpensiveness and ready availability of these substances.

The above described phenol compound (d) may be used singly or in combination of two or more types. A method of combining 2,3,6-trimethylphenol with 2,5-dimethylphenol and using them is applied, for example. In this method, a mixing ratio of the substances can be selected, as appropriate. Moreover, the used phenol compound (d) may comprise small amounts of o-cresol, p-cresol, 2,4-dimethylphenol, 2,4,6-trimethylphenol, and the like, as by-products from the production.

A ratio between the phenol compound (c) and the phenol compound (d) is not particularly limited. Preferably, 100% by mass to 50% by mass of the phenol compound (c) and 0% by mass to 50% by mass of the phenol compound (d), more preferably, 95% by mass to 60% by mass of the phenol compound (c) and 5% by mass to 40% by mass of the phenol compound (d), and further preferably, 85% by mass to 70% by mass of the phenol compound (c) and 15% by mass to 30% by mass of the phenol compound (d), are used based on the monomer mixture as a whole. If the ratio of each phenol compound is within the aforementioned range, the glass transition temperature Tg becomes high, and the produced polyphenylene ether tends to be excellent in terms of heat resistance. Thus, even from the viewpoint of the improvement of mechanical properties, the ratio of phenol compounds is preferably set within the aforementioned range.

In the method for producing the polyphenylene ether (A) in the present embodiment, the good solvent means a solvent capable of dissolving poly(2,6-dimethylphenylene)ether obtained by a conventional method. Examples of such a solvent include: aromatic hydrocarbons such as benzene, toluene, xylene (including o-, m- and p-isomers), ethylbenzene or styrene; halogenated hydrocarbons such as chloroform, methylene chloride, 1,2-dichloroethane, chlorobenzene or dichlorobenzene; and nitro compounds such as nitrobenzene. Moreover, examples of other substances classified into such a good solvent include: aliphatic hydrocarbons such as pentane, hexane, heptane, cyclohexane or cycloheptane; esters such as ethyl acetate or ethyl formate; ethers such as tetrahydrofuran or diethyl ether; and dimethyl sulfoxide. These good solvents may be used singly or in combination of two or more types. Of these, preferred good solvents are aromatic hydrocarbons such as benzene, toluene, xylene, ethylbenzene or styrene, and halogenated hydrocarbons such as chlorobenzene or dichlorobenzene.

In the method for producing the polyphenylene ether (A) in the present embodiment, the poor solvent means a solvent, which does not dissolve at all or hardly dissolves poly(2,6-dimethylphenylene)ether obtained by a conventional method. Such poor solvents are ketones and alcohols, for example. A preferred example is alcohol containing 1 to 10 carbon atoms. Examples of such a poor solvent include methanol, ethanol, propanol, butanol, pentanol, hexanol and ethylene glycol. Such a poor solvent may further include water. These poor solvents may be used singly or in combination of two or more types. Particularly preferred poor solvents are methanol, ethanol, 1-propanol, 2-propanol, n-butanol, 2-butanol and tert-butanol.

Examples of the solvent used include a single aromatic hydrocarbon solvent such as toluene or xylene and a mixed solvent obtained by mixing alcohol such as methanol or ethanol into such a single solvent.

In the production method in the present embodiment, there is applied a precipitation polymerization method in which a ratio of the good solvent and the poor solvent to the polyphenylene ether (A) as a polymer obtained by the oxidative polymerization of phenol compounds is changed, namely, the ratio of the poor solvent is increased, so that the reaction progresses and the polymer is precipitated in the form of particles in the reaction solvent. A ratio (mass ratio) between the good solvent and the poor solvent is preferably 95:5 to 35:65, more preferably 90:10 to 45:65, and further preferably 85:15 to 50:50. When the ratio of each solvent is within the aforementioned range, a scale of the precipitated particles to a reaction vessel becomes extremely small, and thus stable particles are generated. If the ratio of the good solvent is smaller than the aforementioned range, an extremely long polymerization time may be required to obtain a desired molecular weight, or heating from the outside may be required during polymerization. Thus, there may be a case in which polyphenylene ether cannot be efficiently obtained. Moreover, if the ratio of the good solvent exceeds the aforementioned range, there may be a case in which the polymer is not precipitated in the form of particles in the reaction solvent.

In the method for producing the polyphenylene ether (A) in the present embodiment, as the polymerization progresses, the polymerization degree of polyphenylene ether is increased, and thereby, the generated polyphenylene ether cannot be dissolved in a polymerization solvent consisting of the above described good solvent and poor solvent. As a result, the polyphenylene ether begins to be precipitated, and the polymerization solution exhibits a slurry state. The polymerization solution preferably exhibits such a slurry state at a polymerization percentage between 55% and 99% based on the total amounts of the phenol compounds, although it depends on oxygen supply per unit time of polymerization or the ratio between the good solvent and the poor solvent used as the polymerization solvent. Polyphenylene ether having a narrow molecular weight distribution tends to be obtained by the phenomenon that the polymerization solution exhibits such a slurry state at the midpoint of polymerization. When the polymerization degree is increased in the state of a solution without exhibiting a slurry state, a viscosity in a polymerization tank is increased and it becomes difficult to produce polyphenylene ether, or amounts of the phenol compounds used for polymerization need to be decreased or large amounts of the solvents need to be used in order to avoid viscosity increase. Thus, it may not be said that it is an efficient production method.

In the method for producing the polyphenylene ether (A) in the present embodiment, although it depends on the supply of oxygen-containing gas, if polymerization is continued for one or more minutes, after the polymer has been precipitated in the form of particles in the reaction solvent, the characteristics of molecular weight distribution are preferably exhibited. If polymerization is continued for 10 or more minutes, such characteristics are more preferably exhibited, and if polymerization is continued for 30 or more minutes, such characteristics are further preferably exhibited.

A polymerization temperature applied to the method for producing the polyphenylene ether (A) in the present embodiment, namely, a polymerization temperature before precipitation is preferably 0° C. to 50° C., more preferably 10° C. to 40° C., and further preferably 20° C. to 40° C. If the temperature before precipitation is too low, the polymerization reaction may hardly progress. On the other hand, a polymerization temperature after precipitation is preferably 0° C. to 100° C., more preferably 10° C. to 80° C., further preferably 15° C. to 70° C., and particularly preferably 20° C. to 60° C. If the temperature after precipitation is too high, there is a risk that the volatilization of solvents used for polymerization becomes intensive, and that a great burden is placed on cooling/reflux equipment.

As a catalyst used to produce the polyphenylene ether (A), all of known catalyst systems that can be generally used to produce polyphenylene ether can be used. A generally known catalyst system is a catalyst comprising a transition metal ion with redox ability and an amine compound capable of forming a complex with the above-mentioned metal ion. Examples of such a catalyst system include a catalyst system comprising a copper compound and an amine, a catalyst system comprising a manganese compound and an amine, and a catalyst system comprising a cobalt compound and an amine. Since the polymerization reaction efficiently progresses under slightly alkaline conditions, a certain amount of alkali or a further amine may be added to the reaction system.

A catalyst comprising, as constituents thereof, a copper compound, a halogen compound and a diamine compound represented by formula (5) as shown below is preferably used to produce the polyphenylene ether (A).

[Formula 9]

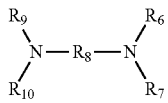

(5)

(wherein $R_6$, $R_7$, $R_9$ and $R_{10}$ each independently represent a hydrogen atom or a linear or branched alkyl group containing 1 to 6 carbon atoms (provided that all of $R_6$, $R_7$, $R_9$ and $R_{10}$ do not simultaneously represent hydrogen atoms), and $R_8$ represents a linear or branched alkylene group containing 2 to 5 carbon atoms).

As a preferred copper compound, a cuprous compound, a cupric compound or a mixture thereof can be used. Examples of such a cuprous compound include cuprous chloride, cuprous bromide, cuprous sulfate and cuprous nitrate. Examples of a cupric compound include cupric chloride, cupric bromide, cupric sulfate and cupric nitrate. Of these, particularly preferred metal compounds are cuprous chloride, cupric chloride, cuprous bromide and cupric bromide. In addition, their copper salts may be synthesized from halogen or acid corresponding to an oxide (e.g. cuprous oxide), a carbonate, a hydroxide or the like, when used. A method of producing copper salts by mixing the above-exemplified cuprous oxide with hydrogen halide (or a solution of hydrogen halide) is often used.

Examples of the halogen compound include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide and tetraethylammonium iodide. Moreover, these halogen compounds may be used in the form of an aqueous solution or a solution in which a suitable solvent is used. These halogen compounds may be used, either singly or in combination of two or more types. Preferred halogen compounds are an aqueous solution of hydrogen chloride and an aqueous solution of hydrogen bromide.

The amounts of these compounds used are not particularly limited. The molar amounts of halogen atoms used are preferably in the range of 2 times or more and 20 times or less, based on the molar amounts of copper atoms. Copper atoms are preferably used in the range of 0.02 moles or more and 0.6 moles or less, based on 100 moles of phenol compounds used.

Next, examples of the diamine compound used as the catalytic component will be given below. Examples of such a diamine compound include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-di-n-propylethylenediamine, N-i-propylethylenediamine, N,N'-di-i-propylethylenediamine, N-n-butylethylenediamine, N,N'-di-n-butylethylenediamine, N-i-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane and N,N,N',N'-tetramethyl-1,5-diaminopentane.

A diamine compound preferably used in the method for producing the polyphenylene ether (A) in the present embodiment is a diamine compound in which an alkylene group ($R_8$) that combines two nitrogen atoms contains 2 or 3 carbon atoms. An amount of such a diamine compound used is not particularly limited. Such a diamine compound is used in the range of 0.01 mole or more and 10 moles or less, based on 100 moles of commonly used phenol compounds.

As constituents of the catalyst used in the method for producing the polyphenylene ether (A) in the present embodiment, it is preferable to further use a tertiary monoamine compound or a secondary monoamine compound, singly or in combination. The tertiary monoamine compound means an aliphatic tertiary amine including an alicyclic tertiary amine. Examples of such a tertiary monoamine compound include trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine. These tertiary monoamine compounds may be used, either singly or in combination of two or more types. An amount of such a tertiary monoamine compound used is not particularly limited. Such a tertiary monoamine compound is preferably used in the range of 15 moles or less based on 100 moles of commonly used phenol compounds. The secondary monoamine compound includes a secondary aliphatic amine. Examples of such a secondary monoamine compound include dimethylamine, diethylamine, di-n-propylamine, di-i-propylamine, di-n-butylamine, di-i-butylamine, di-t-butylamine, dipenthylamines, dihexylamines, dioctylamines, didecylamines, dibenzylamines, methylethylamine, methylpropylamine, methylbutylamine and cyclohexylamine. Examples of a secondary monoamine compound including aromatic series include N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline and diphenylamine, but examples are not limited thereto. These secondary monoamine compounds may be used, either singly or in combination of two or more types. An amount of such a secondary monoamine compound used is not particularly limited. Such a secondary monoamine compound is used in the range of 15 moles or less based on 100 moles of commonly used phenol compounds.

In the method for producing polyphenylene ether (A) in the present embodiment, pure oxygen, a mixture obtained by mixing oxygen with inert gas such as nitrogen at any given ratio, air, a mixture obtained by mixing such air with inert gas such as nitrogen or rare gas at any given ratio, etc. may be used. An ordinary pressure is sufficiently applied as a pressure in a polymerization reaction system. As necessary, a reduced pressure or an increased pressure may also be applied. A rate of supplying oxygen-containing gas can be selected, as appropriate, while taking into consideration heat removal, polymerization rate, etc. In the case of pure oxygen per mole of phenol compound used in polymerization, the rate of supplying such pure oxygen is preferably 5 N mL/min or more, and more preferably 10 N mL/min or more.

In the method for producing polyphenylene ether (A) in the present embodiment, a polymerization method used in polymerization is not particularly limited. In the case of producing many types of polyphenylene ethers, it is preferable to apply a batch method by which polyphenylene ethers having various glass transition temperatures can be easily produced. On the other hand, in a case in which polyphenylene ether is continuously and stably produced, a continuous method is preferably applied.

The polyphenylene ether resin composition in the present embodiment can be melt-mixed with a known thermoplastic resin and a known thermosetting resin. Examples of such a thermoplastic resin and thermosetting resin include polyethylene, polypropylene, polystyrene, an acrylonitrile/styrene resin, an acrylonitrile/butadiene/styrene resin, a methacryl resin, vinyl chloride, polyamide, polyacetal, ultra high molecular weight polyethylene, polybutylene terephthalate, polymethylpentene, polycarbonate, polyphenylene sulfide, polyether ether ketone, a liquid crystal polymer, polytetrafluoroethylene, polyetherimide, polyarylate, polysulphone, polyethersulphone, polyamide-imide, phenol, urea, melamine, unsaturated polyester, alkyd, epoxy and diallyl phthalate. Moreover, for the purpose of imparting effects such as conductivity, fire resistance and shock resistance, a known additive or a known thermoplastic elastomer may further be added during the melt-mixing operation.

Furthermore, to the polyphenylene ether resin composition in the present embodiment, other additives including a plasticizer, a stabilizer, a denaturant, an ultraviolet absorber, a flame retardant, a coloring agent, a mold releasing agent, a fibrous strengthening agent such as glass fiber or carbon fiber, and a filler such as glass beads, calcium carbonate, talc or clay. Examples of such a stabilizer and a denaturant include phosphate esters, hindered phenols, a sulfur-containing antioxidant, alkanolamines, acid amides, dithiocarbamic acid metal salts, inorganic sulfide, metal oxides, carboxylic anhydrides, dienophile compounds such as styrene or stearyl acrylate, and an epoxy group-containing compound, but examples are not limited thereto. These additives may be used singly or in combination.

EXAMPLE

Hereinafter, the present embodiment will be specifically described in the following examples. However, these examples are not intended to limit the present embodiment unless they are deviated from the gist thereof.
[Measurement Methods and Raw Materials Used]
The following methods for measuring physical properties or characteristics, etc., and the following raw materials were used in the present specification.
(1) Measurement of Differential Molecular Weight dW/d (Log M) and Measurement of Weight-Average Molecular Weight A calibration curve was prepared using standard polystyrene by Gel Permeation Chromatography System 21 manufactured by Showa Denko K.K., and it was then used for measurement. There were used standard polystyrenes having molecular weights of 3650000, 2170000, 1090000, 681000, 204000, 52000, 30200, 13800, 3360, 1300 and 550. Two columns (K805L manufactured by Showa Denko K.K.) were placed in series and were then used. Chloroform was used as a solvent, and the flow rate of such a solvent was set at 1.0 mL/min. Measurement was carried out at a column temperature of 40° C. A chloroform solution containing 1 g/L polyphenylene ether was prepared and used for measurement. The UV wavelength at a sensing station was set at 254 nm in the case of standard polystyrene and at 283 nm in the case of polyphenylene ether. The differential molecular weight of the polyphenylene ether (A) was defined as dW/d(Log M) (P), and the differential molecular weight of a polyphenylene ether resin composition obtained after adding a nitrogen compound (B) and then melt-mixing the mixture was defined as dW/d(Log M) (Q). Moreover, the weight-average molecular weight of the polyphenylene ether (A) was defined as Mw(S), and the weight-average molecular weight of the polyphenylene ether resin composition was defined as Mw(R).
(2) Measurement of Reduced Viscosity $\eta sp/c$ and $|(\eta B-\eta A)/\eta A|$ A chloroform solution containing the polyphenylene ether (A) or the polyphenylene ether resin composition at a concentration of 0.5 g/dL was prepared, and the reduced viscosity ($\eta sp/c$) of the solution was then measured at 30° C. using an Ubbelohde viscometer. The used unit was dL/g. The reduced viscosity of the polyphenylene ether (A) was defined as $\eta A$, and the reduced viscosity of the polyphenylene ether resin composition was defined as $\eta B$. The relational expression $|(\eta B-\eta A)/\eta A|$ was calculated.
(3) Observation of Gel A chloroform solution containing the polyphenylene ether resin composition at a concentration of 0.5 g/dL was prepared, and the generation of gel was then confirmed by visual observation. A case in which insoluble matters such as gel were not observed was evaluated as ○, and a case in which large quantities of such insoluble matters was evaluated as X. In addition, a case in which small quantities of such insoluble matters was evaluated as Δ.
(4) Measurement of Glass Transition Temperature In each Example, the glass transition temperature of the polyphenylene ether (A) was measured using a differential scanning calorimeter (DSC) (Pyris 1 manufactured by PerkinElmer). The polyphenylene ether (A) was heated from a room temperature to 280° C. at a temperature increasing rate of 20° C./min in a nitrogen atmosphere, and it was then cooled to 50° C. at a rate of 40° C./min. Thereafter, the glass transition temperature was measured at a temperature increasing rate of 20° C./min.
(5) Measurement of Residual Metal The concentration of metal contained in the polyphenylene ether (A) was measured using an atomic absorption spectrophotometer (AA6650 manufactured by Shimadzu Corporation).
(6) Calculation of Increased Value of Weight-Average Molecular Weight Using the weight-average molecular weight Mw(S) of the polyphenylene ether (A) and the weight-average molecular weight Mw(R) of the polyphenylene ether resin composition, which were obtained by the measurements described in (1) above, an increase value of the molecular weight was calculated according the following formula:

(Increased value of molecular weight)=(Mw(R)−Mw(S))

(7) Fluidity During Molding (SSP)

A dumbbell-shaped piece with a thickness of 0.32 cm was produced from the polyphenylene ether resin composition, using an injection molding machine IS-80EPN (molding temperature: 330° C.; die temperature: 100° C.) manufactured by Toshiba Machine Co., Ltd. Thereafter, a short shot pressure (SSP) of the dumbbell-shaped piece was measured at a gauge pressure.
(8) Measurement of Amount of Fine Particles Generated The polyphenylene ether resin composition, which had been dried after a granulation treatment, was sieved for 30 minutes through a micro electromagnetic vibrating sieving machine (manufactured by Tsutsui Scientific Instruments Co., Ltd.) equipped with meshes of 1700 μm, 1000 μm, 710 μm, 500 μm, 355 μm, 250 μm, 150 μm, 106 μm and 46 μm. The mass of the polyphenylene ether resin composition passed through the 1000-μm mesh was measured, and the percentage of the mass passed through the 1000-μm mesh to the entire mass was calculated.

(9) Measurement of Mean Particle Diameter

When the percentage of fine particles was less than 0.1% by mass, fifty representative particles were selected, and the particle diameters of the fifty particles were measured by random direction measurements using a vernier caliper, and a mean particle diameter was then obtained from the obtained results.

(10) Quantification of Aromatic Hydrocarbon (Volatile Component)

Aromatic hydrocarbon (volatile component) contained in the polyphenylene ether resin was quantified by an internal standard calibration curve method using mesitylene as an internal standard substance, employing a gas chromatography (product name: GC-2010; manufactured by Shimadzu Corporation) equipped with a capillary column (product name: HR-1; manufactured by Shinwa Chemical Industries Ltd.), and a detector FID.

(11) Evaluation of Chemical Resistance (Solvent Resistance)

45 parts by mass of the polyphenylene ether resin composition obtained in each Example was supplied from the top feed of a twin screw extruder ZSK25 (barrel number: 10; screw diameter: 25 mm) manufactured by Werner & Pfleiderer, Germany (a screw pattern having 2 kneading disks L, 6 kneading disks R, and 2 kneading disks N). From barrel 6 in a midcourse, 45 parts by mass of high impact polystyrene and 10 parts by mass of general purpose polystyrene were side fed, and the obtained mixture was then melt-mixed at a cylinder temperature of 300° C. and at a screw rotation number of 250 rpm, so as to obtain a resin composition. Thereafter, 6 dumbbell-shaped pieces each having a thickness of 0.32 cm, which had been molded using an injection molding machine IS-80C (molding temperature: 290° C.; die temperature: 80° C.) manufactured by Toshiba Machine Co., Ltd., were each immersed in a mixed solvent consisting of cyclohexane/isopropyl alcohol=35%/65% by mass for 30 minutes, while applying a distortion of 1% with a bending form. Thereafter, each piece was left at 23° C. for 24 hours, and a tensile test was then carried out to obtain a mean value of the 6 dumbbell-shaped pieces. Thus, a tensile strength retention rate (%) was obtained, when the tensile strength before immersion in the solvent was set at 100%. It was determined that a dumbbell-shaped piece having a high tensile strength retention rate was excellent in terms of solvent resistance.

(Production Example 1 of Polyphenylene Ether)

Nitrogen gas was blown at a flow rate of 500 mL/min into a 1.6-L first polymerization tank with a jacket, which equipped with a sparger for introducing oxygen-containing gas, a stirring turbine blade and a baffle at the bottom portion thereof, a reflux cooling apparatus at a vent gas line in the upper portion thereof, and an overflow line connected to a second polymerization tank at the lateral side thereof. At the same time, 0.295 g of a cupric chloride dihydrate, 1.298 g of 35% hydrochloric acid, 3.266 g of di-n-butylamine, 11.257 g of N,N,N',N'-tetramethylpropanediamine, 715.2 g of xylene, 110.0 g of n-butanol, and 275.1 g of methanol were added to the first polymerization tank. Likewise, nitrogen gas was blown at a flow rate of 1000 mL/min into a 4.0-L second polymerization tank with a jacket, which equipped with a sparger for introducing oxygen-containing gas, a stirring turbine blade and a baffle at the bottom portion of a reaction vessel thereof, a reflux cooling apparatus at a vent gas line in the upper portion of a reaction vessel thereof, and an overflow line connected to a third polymerization tank at the lateral side of the polymerization tank. At the same time, 1635.4 g of xylene, 251.6 g of n-butanol, and 629.0 g of methanol were added to the second polymerization tank. Further, nitrogen gas was blown at a flow rate of 500 mL/min into a 1.5-mL polymerization tank with a jacket, which equipped with a sparger for introducing oxygen-containing gas, a stirring turbine blade and a baffle at the bottom portion of a reaction vessel thereof, a reflux cooling apparatus at a vent gas line in the upper portion of the polymerization tank, and an overflow line at the lateral side of the polymerization tank. At the same time, 390 g of xylene, 60 g of n-butanol, and 150 g of methanol were added to the polymerization tank. Still further, nitrogen gas was blown at a flow rate of 500 mL/min into a 6.0-L raw material tank, which equipped with a line capable of supplying solution to the first polymerization tank by a plunger pump, a stirring turbine blade, and a reflux cooling apparatus at the vent gas line of the upper portion of the tank. At the same time, 0.813 g of a cupric chloride dihydrate, 3.581 g of 35% hydrochloric acid, 9.009 g of di-n-butylamine, 31.054 g of N,N,N',N'-tetramethylpropanediamine, 1973.1 g of xylene, 303.6 g of n-butanol, 758.9 g of methanol, 690.0 g of 2,6-dimethylphenol, and 230.0 g of 2,3,6-trimethylphenol were added to the raw material tank. Thereafter, the solution was mixed by stirring. Since an amount of the solution added to the raw material tank was reduced by subjecting it to polymerization, the solution with the above-described composition was added every time the amount of the solution was reduce.

Subsequently, the polymerization solution was supplied at a flow rate of 17.34 g/min from the first raw material tank to the first polymerization tank which was being intensively stirred, and at the same time, oxygen was introduced at a rate of 449.8 mL/min into the first polymerization tank via the sparger. Furthermore, at the same time overflow from the first polymerization tank to the second polymerization tank began, oxygen was introduced at a rate of 179.9 mL/min via the sparger.

By supplying a heating medium to the jacket, the polymerization temperature was adjusted, so that it could be kept at 40° C. in all of the first, second and third polymerization tanks. Thereafter, polymerization was continued for 40 hours, so that polymerization performed in the first and second polymerization tanks reached a stable state, so as to continuously obtain polyphenylene ether. A polymerization form in the first polymerization tank was solution polymerization, and a polymerization form in the second polymerization tank was precipitation polymerization. Thereafter, polymerization was further continued for 50 hours, and the reaction was then terminated.

An aqueous solution containing 10% ethylenediaminetetraacetic acid tripotassium salt (a reagent manufactured by Dojindo Laboratories) was added to the obtained polymerization mixture, and the obtained mixture was then heated to 50° C. Subsequently, hydroquinone (a reagent manufactured by Wako Pure Chemical Industries, Ltd.) was added by small and small to the reaction solution, and the mixture was then incubated at 50° C., until a slurry polyphenylene ether became white. Thereafter, the white slurry polyphenylene ether was filtrated, and was then washed by pouring methanol on the residual polyphenylene ether, followed by drying, so as to obtain approximately 10.0 kg of polyphenylene ether as a sample.

A reduced viscosity $\eta A$ of the obtained polyphenylene ether was 0.530, and a glass transition temperature Tg of the obtained polyphenylene ether was high (235° C.). No insoluble matters were found in chloroform. Amounts of residual volatile components were 1.0% by mass. Of this total 1.0% by mass, ethylbenzene accounted for approximately 0.3% by mass, and a mixture of o-xylene, p-xylene and m-xylene accounted for approximately 0.7% by mass. In addition, no scale to a reaction vessel and the like was confirmed. This polyphenylene ether was defined as (PPE-1). An amount of residual copper was less than 2 ppm. Other results are shown in the following Tables.

(Production Example 2 of Polyphenylene Ether)

Operations were carried out in the same manner as that in Production Example 1, with the exception that the amount of 2,6-dimethylphenol added to the raw material tank was set at 920.0 g and that 2,3,6-trimethylphenol was not added. A reduced viscosity $\eta A$ of the obtained polyphenylene ether was 0.530, and a glass transition temperature Tg of the obtained polyphenylene ether was 221° C. No insoluble matters were found in chloroform. Amounts of residual volatile components were 0.9% by mass. Of this total 0.9% by mass, ethylbenzene accounted for approximately 0.2% by mass, and a mixture of o-xylene, p-xylene and m-xylene accounted for approximately 0.7% by mass. In addition, no scale to a reaction vessel and the like was confirmed. This polyphenylene ether was defined as (PPE-2). An amount of residual copper was less than 2 ppm. Other results are shown in the following Tables.

(Production Example 3 of Polyphenylene Ether)

Nitrogen gas was blown at a flow rate of 2.5 L/min into a 500-L polymerization tank with a jacket, which equipped with a sparger for introducing oxygen-containing gas, a stirring turbine blade and a baffle at the bottom portion thereof, and a reflux cooling apparatus at a vent gas line in the upper portion thereof. At the same time, 20.6 g of cupric oxide, 155.0 g of 47% hydrogen bromide aqueous solution, 49.7 g of di-t-butylethylenediamine, 240.4 g of di-n-butylamine, 731.7 g of butyldimethylamine, 300 kg of toluene, 16.0 kg of 2,6-dimethylphenol were added to the polymerization tank. The obtained mixture was stirred, until it became a uniform solution and the internal temperature of the reaction vessel became 25° C.

Subsequently, oxygen gas was introduced via the sparger at a rate of 10 NL/min into the polymerization tank that was being intensively stirred, so as to begin polymerization. After the supply of the oxygen-containing gas for 320 minutes, the temperature was gradually increased and was then controlled, so that the internal temperature became 40° C. at the time of termination of the polymerization. The polymerization solution was in a solution state at the time of termination of the polymerization.

The supply of the oxygen-containing gas was terminated. 10 kg of an aqueous solution containing 2.5% ethylenediaminetetraacetic acid tetrasodium salt (a reagent manufactured by Dojindo Laboratories) was added to the obtained polymerization mixture, and the obtained mixture was then stirred until it became 70° C. Thereafter, the stirring operation was continued for 100 minutes, and the reaction solution was then left at rest, so that an organic phase was separated from a water phase by liquid-liquid separation. An excessive amount of methanol was added to the obtained organic phase, and the precipitated polyphenylene ether was then separated by filtration. Thereafter, methanol washing was repeatedly carried out, followed by drying, so as to obtain polyphenylene ether. A reduced viscosity $\eta A$ of the obtained polyphenylene ether was 0.510, and a glass transition temperature Tg of the obtained polyphenylene ether was 220° C. No insoluble matters were found in chloroform. Amounts of residual volatile components were 0.5% by mass. Of this total 0.5% by mass, almost all substances were toluene. This polyphenylene ether was defined as (PPE-3). An amount of residual copper was less than 2 ppm. Other results are shown in the following Tables.

(Production Example 4 of Polyphenylene Ether)

PPE-1 was dried at 180° C. at 1 mmHg for total 48 hours to result in absolute dry, so as to obtain polyphenylene ether. A reduced viscosity $\eta A$ of the obtained polyphenylene ether was 0.530, and a glass transition temperature Tg of the obtained polyphenylene ether was 235° C. No insoluble matters were found in chloroform. Amounts of residual volatile components were 0.04% by mass. Ethylbenzene and xylene could not be quantified. This polyphenylene ether was defined as (PPE-4). An amount of residual copper was less than 2 ppm. Other results are shown in the following Tables.

(Polyphenylene Ethers (A) Used in Examples and Comparative Examples)

PPE-1 to PPE-4

(Nitrogen Compounds (B) Used in Examples and Comparative Examples)

Dibutylamine (referred to as DBA)

N,N'-1,2-ethylenediamine (referred to as 1,2-EDA) (manufactured by Wako Pure Chemical Industries, Ltd.)

N,N'-1,3-propanediamine (referred to as 1,3-PDA) (manufactured by Wako Pure Chemical Industries, Ltd.)

N,N'-1,4-butyldiamine (referred to as 1,4-BDA) (manufactured by Wako Pure Chemical Industries, Ltd.)

N,N'-1,5-pentanediamine (referred to as 1,5-PDA) (manufactured by Tokyo Chemical Industry Co., Ltd.)

N,N'-1,6-hexanediamine (referred to as 1,6-HDA) (manufactured by Wako Pure Chemical Industries, Ltd.)

N,N'-1,7-heptanediamine (referred to as 1,7-HDA) (manufactured by Wako Pure Chemical Industries, Ltd.)

N,N,N',N'-tetramethyl-1,3-propanediamine (referred to as TMDPA) (manufactured by Wako Pure Chemical Industries, Ltd.)

N,N'-di-t-butylethylenediamine (referred to as DtBEDA) (manufactured by Tokyo Chemical Industry Co., Ltd.)

Polyethyleneimine (trade name: EPOMIN RSP-003; manufactured by Nippon Shokubai Co., Ltd.) (referred to as SP-003)

Polyethyleneimine (trade name: EPOMIN RSP-018; manufactured by Nippon Shokubai Co., Ltd.) (referred to as SP-018)

Polyethyleneimine (trade name: EPOMIN RSP-200; manufactured by Nippon Shokubai Co., Ltd.) (referred to as SP-200)

(Polystyrene-Based Resins Used in Examples and Comparative Examples)

High impact polystyrene (trade name: PS6200; manufactured by Nova Chemicals, U.S.A.)

General purpose polystyrene (trade name: STYRON 660, manufactured by The Dow Chemical Company, U.S.A.)

Example 1

10 kg of (PPE-1) was uniformly mixed with 50.3 g of di-n-butylamine used as a nitrogen compound (B), using a Henschel mixer. Thereafter, using a twin screw extruder ZSK25 (manufactured by Werner & Pfleiderer, Germany; barrel number: 10; screw diameter: 25 mm; a screw pattern having 1 kneading disk L, 1 kneading disk R and 2 kneading disks N), the obtained mixture was then melt-mixed at a barrel temperature of 310° C. and at a screw rotation number of 200 rpm, so as to produce a strand at a discharge rate of 10 kg/hour. The thus melt-mixed strand was immersed in a water bath, and it was then granulated with a strand cutter. The obtained granulated product was transparent. The obtained results are shown in Table 1.

Examples 2 to 38

Operations were carried out in the same manner as that in Example 1, with the exception that a type of polyphenylene ether and an additive amount and type of nitrogen compound (B) are as shown in Tables 1 to 3. The results are shown in Tables 1 to 3.

Comparative Example 1

Operations were carried out in the same manner as that in Example 1, with the exception that (PPE-1) was used as polyphenylene ether and that nitrogen compound (B) was not added. The obtained results are shown in Table 4.

Comparative Examples 2 to 4

Operations were carried out in the same manner as that in Comparative Example 1, with the exception that the polyphenylene ethers shown in Table 4 were used. The obtained results are shown in Table 4.

Reference Examples 1 to 12 and Comparative Examples 5 to 7

Operations were carried out in the same manner as that in Example 1, with the exception that a type of polyphenylene ether and an additive amount and type of nitrogen compound (B) are as shown in Tables 4 and 5. The results are shown in Tables 4 and 5.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Type of PPE | PPE-1 | PPE-1 | PPE-1 | PPE-1 | PPE-1 | PPE-1 | PPE-1 | PPE-1 | PPE-1 | PPE-1 |
| $\eta A$ (dL/g) | 0.53 | 0.53 | 0.53 | 0.53 | 0.53 | 0.53 | 0.53 | 0.53 | 0.53 | 0.53 |
| dW/d(LogM)(P) | 1.11 | 1.11 | 1.11 | 1.11 | 1.11 | 1.11 | 1.11 | 1.11 | 1.11 | 1.11 |
| Compound (B) | DBA | 1,2-EDA | 1,3-PDA | 1,4-BDA | 1,5-PDA | 1,6-HDA | 1,7-HDA | TMDAP | DtBEDA | SP-003 |
| Parts by mass of compound (B) to 100 parts by mass of PPE | 0.5 | 0.5 | 0.5 | 0.5 | 0.5 | 0.5 | 0.5 | 0.5 | 0.5 | 0.5 |
| $\eta B$ (dL/g) | 0.562 | 0.532 | 0.501 | 0.534 | 0.540 | 0.555 | 0.560 | 0.582 | 0.570 | 0.532 |
| dW/d(LogM)(Q) | 1.02 | 1.09 | 1.07 | 1.08 | 1.08 | 1.06 | 1.06 | 1.04 | 1.04 | 1.09 |
| $|(\eta B - \eta A)/\eta A|$ | 0.060 | 0.004 | 0.055 | 0.008 | 0.019 | 0.047 | 0.057 | 0.098 | 0.075 | 0.004 |
| Mean particle diameter (mm) | 3.0 | 2.8 | 2.7 | 2.6 | 2.8 | 2.6 | 2.4 | 2.9 | 2.4 | 2.8 |
| Fine particle amount (mass %) | <0.1 | <0.1 | <0.1 | <0.1 | <0.1 | <0.1 | <0.1 | <0.1 | <0.1 | <0.1 |
| Gel | ◯ | ◯ | ◯ | ◯ | ◯ | ◯ | ◯ | ◯ | ◯ | ◯ |
| (Mw (R)-Mw (S)) | 4700 | 200 | 15000 | 550 | 1000 | 4560 | 5000 | 6300 | 6100 | 80 |
| SSP (MPa) of polyphenylene ether resin composition | 9.1 | 9.3 | 9.1 | 9.2 | 9.2 | 9.3 | 9.1 | 9.3 | 9.3 | 7.2 |
| Tensile retention (%) | 81 | 80 | 77 | 80 | 81 | 83 | 83 | 81 | 82 | 96 |

TABLE 2

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Type of PPE | PPE-1 | PPE-1 | PPE-1 | PPE-1 | PPE-1 | PPE-1 | PPE-1 | PPE-1 | PPE-2 | PPE-2 |
| $\eta A$ (dL/g) | 0.53 | 0.53 | 0.53 | 0.53 | 0.53 | 0.53 | 0.53 | 0.53 | 0.53 | 0.53 |
| dW/d(LogM)(P) | 1.11 | 1.11 | 1.11 | 1.11 | 1.11 | 1.11 | 1.11 | 1.11 | 1.31 | 1.31 |
| Compound (B) | SP-018 | SP-200 | DBA | 1,3-PDA | 1,4-BDA | SP-003 | SP-018 | SP-200 | DBA | 1,3-PDA |
| Parts by mass of compound (B) to 100 parts by mass of PPE | 0.5 | 0.5 | 1.4 | 1.4 | 1.4 | 1.4 | 1.4 | 1.4 | 0.5 | 0.5 |
| $\eta B$ (dL/g) | 0.532 | 0.531 | 0.560 | 0.532 | 0.534 | 0.532 | 0.531 | 0.531 | 0.549 | 0.538 |
| dW/d(LogM)(Q) | 1.09 | 1.10 | 1.05 | 1.08 | 1.09 | 1.10 | 1.10 | 1.10 | 1.24 | 1.26 |
| $|(\eta B - \eta A)/\eta A|$ | 0.004 | 0.002 | 0.057 | 0.004 | 0.008 | 0.004 | 0.002 | 0.002 | 0.036 | 0.015 |
| Mean particle diameter (mm) | 2.8 | 2.8 | 2.6 | 2.4 | 2.9 | 2.4 | 2.6 | 2.8 | 2.8 | 2.0 |
| Fine particle amount (mass %) | <0.1 | <0.1 | <0.1 | <0.1 | <0.1 | <0.1 | <0.1 | <0.1 | <0.1 | <0.1 |
| Gel | ◯ | ◯ | ◯ | ◯ | ◯ | ◯ | ◯ | ◯ | ◯ | ◯ |
| (Mw (R)-Mw (S)) | 100 | 80 | 4400 | 250 | 550 | 250 | 180 | 80 | 1410 | 600 |
| SSP (MPa) of polyphenylene ether resin composition | 7.4 | 7.2 | 8.5 | 8.0 | 7.7 | 6.8 | 6.7 | 6.6 | 8.8 | 8.5 |
| Tensile retention (%) | 98 | 99 | 72 | 75 | 73 | 89 | 92 | 95 | 81 | 82 |

TABLE 3

| | Example 21 | Example 22 | Example 23 | Example 24 | Example 25 | Example 26 | Example 27 | Example 28 | Example 29 |
|---|---|---|---|---|---|---|---|---|---|
| Type of PPE | PPE-2 | PPE-2 | PPE-2 | PPE-2 | PPE-3 | PPE-3 | PPE-3 | PPE-1 | PPE-1 |
| ηA (dL/g) | 0.53 | 0.53 | 0.53 | 0.53 | 0.44 | 0.44 | 0.44 | 0.53 | 0.53 |
| dW/d(LogM)(P) | 1.31 | 1.31 | 1.31 | 1.31 | 1.03 | 1.03 | 1.03 | 1.11 | 1.11 |
| Compound (B) | 1,4-BDA | SP-003 | SP-018 | SP-200 | DBA | SP-003 | SP-018 | DBA | SP-018 |
| Parts by mass of compound (B) to 100 parts by mass of PPE | 0.5 | 0.5 | 0.5 | 0.5 | 0.7 | 0.7 | 0.7 | 3 | 3 |
| ηB (dL/g) | 0.537 | 0.532 | 0.534 | 0.532 | 0.480 | 0.450 | 0.450 | 0.561 | 0.532 |
| dW/d(LogM)(Q) | 1.27 | 1.10 | 1.29 | 1.29 | 1.01 | 1.01 | 1.02 | 1.04 | 1.09 |
| |(ηB − ηA)/ηA| | 0.013 | 0.004 | 0.008 | 0.004 | 0.091 | 0.023 | 0.023 | 0.058 | 0.004 |
| Mean particle diameter (mm) | 2.4 | 2.4 | 2.6 | 2.5 | 2.8 | 2.9 | 2.6 | 2.8 | 2.8 |
| Fine particle amount (mass %) | <0.1 | <0.1 | <0.1 | <0.1 | <0.1 | <0.1 | <0.1 | <0.1 | <0.1 |
| Gel | ○ | ○ | ○ | ○ | ○ | ○ | ○ | ○ | ○ |
| (Mw (R)−Mw (S)) | 600 | 220 | 580 | 120 | 4000 | 890 | 950 | 4400 | 230 |
| SSP (MPa) of polyphenylene ether resin composition | 8.4 | 6.5 | 6.6 | 6.5 | 7.1 | 6.2 | 6.2 | 8.4 | 6.8 |
| Tensile retention (%) | 82 | 95 | 98 | 98 | 72 | 81 | 82 | 72 | 89 |

| | Example 30 | Example 31 | Example 32 | Example 33 | Example 34 | Example 35 | Example 36 | Example 37 | Example 38 |
|---|---|---|---|---|---|---|---|---|---|
| Type of PPE | PPE-1 | PPE-1 | PPE-2 | PPE-2 | PPE-2 | PPE-3 | PPE-3 | PPE-3 | PPE-3 |
| ηA (dL/g) | 0.53 | 0.53 | 0.53 | 0.53 | 0.53 | 0.44 | 0.44 | 0.44 | 0.44 |
| dW/d(LogM)(P) | 1.11 | 1.11 | 1.31 | 1.31 | 1.31 | 1.11 | 1.11 | 1.11 | 1.11 |
| Compound (B) | SP-003 | SP-200 | SP-018 | SP-003 | SP-200 | DBA | SP-018 | SP-003 | SP-200 |
| Parts by mass of compound (B) to 100 parts by mass of PPE | 3 | 3 | 3 | 3 | 3 | 3 | 3 | 3 | 3 |
| ηB (dL/g) | 0.531 | 0.531 | 0.533 | 0.532 | 0.532 | 0.478 | 0.450 | 0.450 | 0.450 |
| dW/d(LogM)(Q) | 1.10 | 1.10 | 1.15 | 1.29 | 1.29 | 0.99 | 1.00 | 0.99 | 1.01 |
| |(ηB − ηA)/ηA| | 0.002 | 0.002 | 0.006 | 0.004 | 0.004 | 0.086 | 0.023 | 0.023 | 0.023 |
| Mean particle diameter (mm) | 2.8 | 2.8 | 2.6 | 2.6 | 2.6 | 2.8 | 2.8 | 2.8 | 2.8 |
| Fine particle amount (mass %) | <0.1 | <0.1 | <0.1 | <0.1 | <0.1 | <0.1 | <0.1 | <0.1 | <0.1 |
| Gel | ○ | ○ | ○ | ○ | ○ | ○ | ○ | ○ | ○ |
| (Mw (R)−Mw (S)) | 120 | 80 | 200 | 490 | 150 | 3700 | 790 | 750 | 760 |
| SSP (MPa) of polyphenylene ether resin composition | 6.7 | 6.7 | 6.5 | 6.5 | 6.5 | 7.0 | 6.1 | 6.1 | 6.1 |
| Tensile retention (%) | 89 | 92 | 94 | 96 | 98 | 70 | 82 | 81 | 83 |

TABLE 4

| | Comparative Example 1 | Comparative Example 2 | Comparative Example 3 | Comparative Example 4 | Reference Example 1 | Reference Example 2 | Reference Example 3 | Reference Example 4 |
|---|---|---|---|---|---|---|---|---|
| Type of PPE | PPE-1 | PPE-2 | PPE-3 | PPE-4 | PPE-1 | PPE-1 | PPE-1 | PPE-3 |
| ηA (dL/g) | 0.53 | 0.53 | 0.44 | 0.53 | 0.53 | 0.53 | 0.53 | 0.44 |
| dW/d(LogM)(P) | 1.11 | 1.31 | 0.92 | 1.11 | 1.11 | 1.11 | 1.11 | 1.03 |
| Compound (B) | — | — | — | — | DBA | SP-003 | SP-018 | DBA |
| Parts by mass of compound (B) to 100 parts by mass of PPE | 0 | 0 | 0 | 0 | 8 | 8 | 8 | 8 |
| ηB (dL/g) | 0.650 | 0.620 | 0.565 | 0.700 | 0.562 | 0.532 | 0.532 | 0.460 |
| dW/d(LogM)(Q) | 0.89 | 1.08 | 0.82 | 0.89 | 1.02 | 1.09 | 1.09 | 0.98 |
| |(ηB − ηA)/ηA| | 0.226 | 0.170 | 0.284 | 0.321 | 0.060 | 0.004 | 0.004 | 0.045 |
| Mean particle diameter (mm) | 2.8 | 2.9 | 3.0 | 2.8 | 3.0 | 2.8 | 2.8 | 2.8 |
| Fine particle amount (mass %) | <0.1 | <0.1 | <0.1 | <0.1 | <0.1 | <0.1 | <0.1 | <0.1 |
| Gel | X | X | X | X | ○ | ○ | ○ | ○ |
| (Mw (R)−Mw (S)) | 35000 | 20600 | 19800 | 40250 | 4700 | 70 | 80 | 1510 |
| SSP (MPa) of polyphenylene ether resin composition | 13.5 | 12.0 | 10.1 | 13.6 | 6.9 | 6.8 | 6.4 | 6.5 |
| Tensile retention (%) | 85 | 95 | 93 | 85 | 20 | 16 | 18 | 18 |

TABLE 4-continued

| | Reference Example 5 | Reference Example 6 | Reference Example 7 | Reference Example 8 | Reference Example 9 | Reference Example 10 | Reference Example 11 | Reference Example 12 |
|---|---|---|---|---|---|---|---|---|
| Type of PPE | PPE-3 | PPE-3 | PPE-1 | PPE-1 | PPE-1 | PPE-2 | PPE-2 | PPE-2 |
| ηA (dL/g) | 0.44 | 0.44 | 0.53 | 0.53 | 0.53 | 0.53 | 0.53 | 0.53 |
| dW/d(LogM)(P) | 1.03 | 1.03 | 1.11 | 1.11 | 1.11 | 1.31 | 1.31 | 1.31 |
| Compound (B) | SP-003 | SP-018 | SP-018 | SP-003 | SP-200 | SP-018 | SP-003 | SP-200 |
| Parts by mass of compound (B) to 100 parts by mass of PPE | 8 | 8 | 5 | 5 | 5 | 5 | 5 | 5 |
| ηB (dL/g) | 0.450 | 0.450 | 0.532 | 0.532 | 0.532 | 0.532 | 0.532 | 0.532 |
| dW/d(LogM)(Q) | 0.99 | 0.99 | 1.09 | 1.09 | 1.09 | 1.29 | 1.29 | 1.29 |
| \|(ηB − ηA)/ηA\| | 0.023 | 0.023 | 0.004 | 0.004 | 0.004 | 0.004 | 0.004 | 0.004 |
| Mean particle diameter (mm) | 2.4 | 2.6 | 2.8 | 2.8 | 2.8 | 2.6 | 2.6 | 2.6 |
| Fine particle amount (mass %) | <0.1 | <0.1 | <0.1 | <0.1 | <0.1 | <0.1 | <0.1 | <0.1 |
| Gel | ○ | ○ | ○ | ○ | ○ | ○ | ○ | ○ |
| (Mw (R)−Mw (S)) | 650 | 700 | 90 | 80 | 80 | 360 | 580 | 120 |
| SSP (MPa) of polyphenylene ether resin composition | 6.6 | 6.1 | 6.4 | 6.3 | 6.4 | 6.2 | 6.2 | 6.2 |
| Tensile retention (%) | 15 | 16 | 40 | 38 | 43 | 45 | 41 | 46 |

TABLE 5

| | Comparative Example 5 | Comparative Example 6 | Comparative Example 7 |
|---|---|---|---|
| Type of PPE | PPE-4 | PPE-4 | PPE-4 |
| ηA (dL/g) | 0.53 | 0.53 | 0.53 |
| dW/d(LogM) (P) | 1.11 | 1.11 | 1.11 |
| Compound (B) | DBA | SP-003 | SP-018 |
| Parts by mass of compound (B) to 100 parts by mass of PPE | 0.5 | 0.5 | 0.5 |
| ηB (dL/g) | 0.610 | 0.600 | 0.600 |
| dW/d(LogM) (Q) | 0.93 | 0.94 | 0.96 |
| \|(ηB − ηA)/ηA\| | 0.151 | 0.132 | 0.132 |
| Mean particle diameter (mm) | 2.8 | 3.0 | 2.4 |
| Fine particle amount (mass %) | <0.1 | <0.1 | <0.1 |
| Gel | Δ | Δ | Δ |
| (Mw (R) − Mw (S)) | 10500 | 7800 | 8100 |
| SSP (MPa) of polyphenylene ether resin composition | 11.8 | 11.2 | 11.0 |
| Tensile retention (%) | 51 | 58 | 61 |

From the results shown in Tables 1 to 3, it was found that the polyphenylene ether resin compositions shown in Examples 1 to 38 each maintained a narrow molecular weight distribution as a result of the addition of a small amount of the nitrogen compound (B), and that these polyphenylene ether resin compositions achieved both good chemical resistance and fluidity during processing. Moreover, the generation of gel was not confirmed.

Furthermore, the granulated products of these resin compositions had a mean particle diameter of 1 mm or more, without the generation of fine particles, and were excellent in terms of handleability such as no dust floating.

In contrast, since the polyphenylene ether resin compositions produced in Comparative Examples 1 to 4 did not contain such a nitrogen compound (B), they had a wide molecular weight distribution, and the generation of gel was also confirmed. Further, these polyphenylene ether resin compositions were inferior to the polyphenylene ether resin compositions of the above-mentioned Examples in terms of fluidity during processing and chemical resistance.

The polyphenylene ether resin compositions produced in Reference Examples 1 to 12 had excellent fluidity during processing, but had poor chemical resistance. That is to say, these results show that, if a nitrogen compound (B) is added in an amount more than necessary, it becomes difficult to achieve both fluidity during processing and chemical resistance.

It is assumed that, since the polyphenylene ether resin compositions produced in Comparative Examples 5 to 7 did not contain a sufficient amount of aromatic hydrocarbon in the polyphenylene ether (A), the diffusion of the nitrogen compound (B) into the resin became insufficient. Thereby, these resin compositions had a wide molecular weight distribution, the generation of gel was confirmed, and further, a sufficient improvement was not done with regard to fluidity during processing and chemical resistance.

The present application is based on a Japanese patent application (Patent Application No. 2008-125231), filed to the Japan Patent Office on May 12, 2008; the disclosure of which is hereby incorporated by reference.

Industrial Applicability

The polyphenylene ether resin composition of the present invention is excellent in terms of fluidity during molding and suppresses the generation of gel. Moreover, since the present polyphenylene ether resin composition has a narrow molecular weight distribution, it is also excellent in terms of physical properties. Utilizing such characteristics, the polyphenylene ether resin composition of the present invention is industrially applicable in the field of various mechanical components, automobile components, and electric and electronic components, and particularly, in the field of sheet and film materials.

The invention claimed is:

1. A polyphenylene ether resin composition obtainable by melt-mixing
a polyphenylene ether (A) comprising a structural unit (a) represented by the following formula (1):

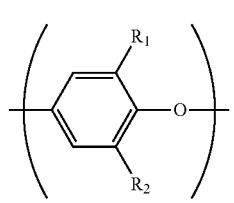

wherein $R_1$ and $R_2$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and/or a structural unit (b) represented by the following formula (2):

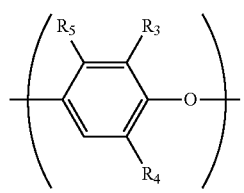

(2)

wherein $R_3$ and $R_4$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and $R_5$ represents a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, with a nitrogen compound (B) comprising at least three groups selected from the group consisting of primary amino groups, secondary amino groups, and tertiary amino groups in a single molecule thereof, wherein the polyphenylene ether (A) comprises 0.1% by mass or more and 1.5% by mass or less of at least one type of aromatic hydrocarbon (C) containing 7 or 8 carbon atoms, the primary amino groups, the secondary amino groups, and the tertiary amino groups are each contained in an amount of 0.1% by mole or more in the nitrogen compound (B), and a molecular weight of the nitrogen compound (B) is 200 or more.

2. The polyphenylene ether resin composition according to claim 1, wherein the polyphenylene ether (A) comprises 0.1% by mass or more and 1.0% by mass or less of the aromatic hydrocarbon (C).

3. The polyphenylene ether resin composition according to claim 1, wherein the polyphenylene ether (A) comprises at least two types of the aromatic hydrocarbons (C).

4. The polyphenylene ether resin composition according to claim 1, wherein the structural unit (a) is a structural unit (a1) wherein $R_1$ and $R_2$ are methyl groups, and the structural unit (b) is a structural unit (b1) wherein $R_3$, $R_4$ and $R_5$ are methyl groups.

5. The polyphenylene ether resin composition according to claim 1, wherein an amine equivalent of the nitrogen compound (B) is 150 or less.

6. The polyphenylene ether resin composition according to claim 1, which comprises 0.1 part by mass or more and less than 5 parts by mass of the nitrogen compound (B) based on 100 parts by mass of the polyphenylene ether (A).

7. The polyphenylene ether resin composition according to claim 1, wherein a maximum value of dW/d(Log M) of the polyphenylene ether (A) measured by gel permeation chromatography using standard polystyrene as a calibration curve is 1.0 or more.

8. The polyphenylene ether resin composition according to claim 1, wherein a maximum value of dW/d(Log M) of the polyphenylene ether resin composition obtained after adding the nitrogen compound (B) and then melt-mixing the mixture measured by gel permeation chromatography using standard polystyrene as a calibration curve is 1.0 or more.

9. The polyphenylene ether resin composition according to claim 1, wherein a reduced viscosity ηA of the polyphenylene ether (A) is 0.3 dL/g or more.

10. The polyphenylene ether resin composition according to claim 1, wherein a reduced viscosity ηA of the polyphenylene ether (A) and a reduced viscosity ηB of the polyphenylene ether resin composition satisfy a relational expression |(ηB−ηA)/ηA|≦0.1.

11. The polyphenylene ether resin composition according to claim 10, wherein the relational expression satisfies |(ηB−ηA)/ηA|≦0.08.

12. The polyphenylene ether resin composition according to claim 1, wherein the polyphenylene ether (A) is a polymer obtainable by a method comprising: subjecting
a mixed phenol compound comprising a phenol compound (c) represented by the following formula (3):

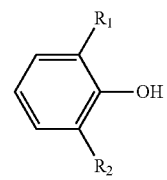

(3)

wherein $R_1$ and $R_2$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and/or a phenol compound (d) represented by the following formula (4):

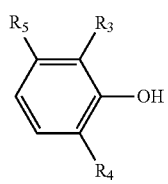

(4)

wherein $R_3$, $R_4$ and $R_5$ each independently represent a hydrogen atom, a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, and $R_5$ represents a halogen atom, an optionally substituted alkyl group, an optionally substituted alkoxy group, an optionally substituted aryl group, an optionally substituted aryloxy group, an optionally substituted aralkyl group or an optionally substituted aralkyloxy group, to oxidative coupling, using a mixed solvent comprising at least one type of good solvent for the polyphenylene ether and at least one type of poor solvent for the polyphenylene ether, in the presence of a catalyst, using an oxygen-containing gas; and then precipitating the reaction product at a late stage of polymerization.

13. The polyphenylene ether resin composition according to claim 12, wherein the catalyst comprises a copper compound and/or a halogen compound.

14. The polyphenylene ether resin composition according to claim 12, wherein an amount of the residual catalyst is 2 ppm or less.

15. The polyphenylene ether resin composition according to claim 12, wherein the phenol compound (c) is 2,6-dimethylphenol and the phenol compound (d) is 2,3,6-trimethylphenol.

16. The polyphenylene ether resin composition according to claim 1, wherein a molecular weight of the nitrogen compound (B) is 500 or more.

17. The polyphenylene ether resin composition according to claim 16, wherein a molecular weight of the nitrogen compound (B) is 1000 or more.

* * * * *